US012574665B2

(12) United States Patent
Li

(10) Patent No.: US 12,574,665 B2
(45) Date of Patent: Mar. 10, 2026

(54) DATA PROCESSING METHOD, OUTDOOR UNIT, INDOOR UNIT AND COMPUTER-READABLE STORAGE MEDIUM

(71) Applicant: ZTE CORPORATION, Shenzhen (CN)

(72) Inventor: Cui Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 294 days.

(21) Appl. No.: 18/557,434

(22) PCT Filed: Apr. 13, 2022

(86) PCT No.: PCT/CN2022/086672
§ 371 (c)(1),
(2) Date: Oct. 26, 2023

(87) PCT Pub. No.: WO2022/252836
PCT Pub. Date: Dec. 8, 2022

(65) Prior Publication Data
US 2024/0214710 A1 Jun. 27, 2024

(30) Foreign Application Priority Data
Jun. 1, 2021 (CN) .......................... 202110607747.3

(51) Int. Cl.
*H04Q 5/24* (2006.01)
*H04L 12/46* (2006.01)
(52) U.S. Cl.
CPC .............. *H04Q 5/24* (2013.01); *H04L 12/46* (2013.01)
(58) Field of Classification Search
CPC .. H04Q 5/24; H04Q 3/00; H04Q 2213/13003; H04L 12/46; H04W 4/12;
(Continued)

(56) References Cited

U.S. PATENT DOCUMENTS 7,400,719 B2 * 7/2008 Zhou ..................... H04M 3/007
379/399.01
8,553,621 B2 * 10/2013 Wang .................. H04M 7/0057
455/414.1
(Continued)

FOREIGN PATENT DOCUMENTS

CN 103823399 A 5/2014
CN 208806803 U 4/2019
(Continued)

OTHER PUBLICATIONS

International Searching Authority. International Search Report and Written Opinion for PCT Application No. PCT/CN2022/086672 and English translation, mailed Jun. 16, 2022, pp. 1-10.
(Continued)

*Primary Examiner* — Akelaw Teshale
(74) *Attorney, Agent, or Firm* — Vivacqua Crane, PLLC

(57) ABSTRACT

The present disclosure provides a data processing method, an outdoor unit (IDU), an indoor unit (ODU), and a computer-readable storage medium. The method performed by an IDU communicating with an ODU may include: receiving an operation status signal from a user-side device; generating a Subscriber Line Interface Circuit (SLIC) event message corresponding to the operation status signal according to the operation status signal; generating a first SLIC control flow according to the SLIC event message, where the first SLIC control flow carries first label information corresponding to the SLIC event message; and sending the first SLIC control flow to the ODU, where the first label information indicates the SLIC event message which is processible to a voice protocol stack.

18 Claims, 10 Drawing Sheets

(58) Field of Classification Search
CPC .. H04M 7/0057; H04M 7/0069; H04M 7/006;
H04M 1/2473; H04M 3/42323; H04M
3/005; H04M 2207/20; H04M 1/738;
H04M 1/2535; H04M 7/0024
See application file for complete search history.

(56) References Cited

U.S. PATENT DOCUMENTS

| | | | | |
|---|---|---|---|---|
| 2004/0037265 A1* | 2/2004 | Huang | ................ | H04M 7/0069 |
| | | | | 370/352 |
| 2005/0169250 A1* | 8/2005 | Kwak | ................ | H04M 7/0069 |
| | | | | 370/352 |
| 2006/0067302 A1* | 3/2006 | Wengrovitz | ........ | H04M 1/2535 |
| | | | | 370/352 |
| 2007/0105548 A1 | 5/2007 | Mohan et al. | | |
| 2007/0172052 A1* | 7/2007 | Ou Yang | ............. | H04M 19/001 |
| | | | | 379/423 |
| 2007/0223455 A1* | 9/2007 | Chang | ................ | H04M 7/0057 |
| | | | | 370/352 |
| 2011/0080904 A1* | 4/2011 | Nguyen | ................. | H04L 12/66 |
| | | | | 370/352 |
| 2011/0081014 A1* | 4/2011 | Zhou | ................... | H04M 19/005 |
| | | | | 379/413 |
| 2016/0352438 A1 | 12/2016 | Robinson et al. | | |
| 2019/0110168 A1* | 4/2019 | Wong | ...................... | H04W 4/16 |
| 2019/0379785 A1* | 12/2019 | Ma | .......................... | H04M 7/00 |

FOREIGN PATENT DOCUMENTS

| | | | | |
|---|---|---|---|---|
| CN | 110572817 A | 12/2019 | | |
| EP | 0729259 A1 * | 8/1996 | ............ | H04M 19/02 |
| EP | 1990985 A1 * | 11/2008 | .......... | H04M 7/0069 |
| EP | 2408163 A1 * | 1/2012 | .......... | H04M 7/0057 |
| WO | WO-2023034945 A1 * | 3/2023 | ...... | H04W 36/00226 |

OTHER PUBLICATIONS

Jiang, Z., "Multi-Service PDH Digital Microwave System Research and Design," Information & Technology, China Master's Theses Full-Text Database, No. 02, Aug. 2007.

European Patent Office. Extended European Search Report for EP Application No. 22814883.9, mailed Aug. 29, 2024, pp. 1-9.

* cited by examiner

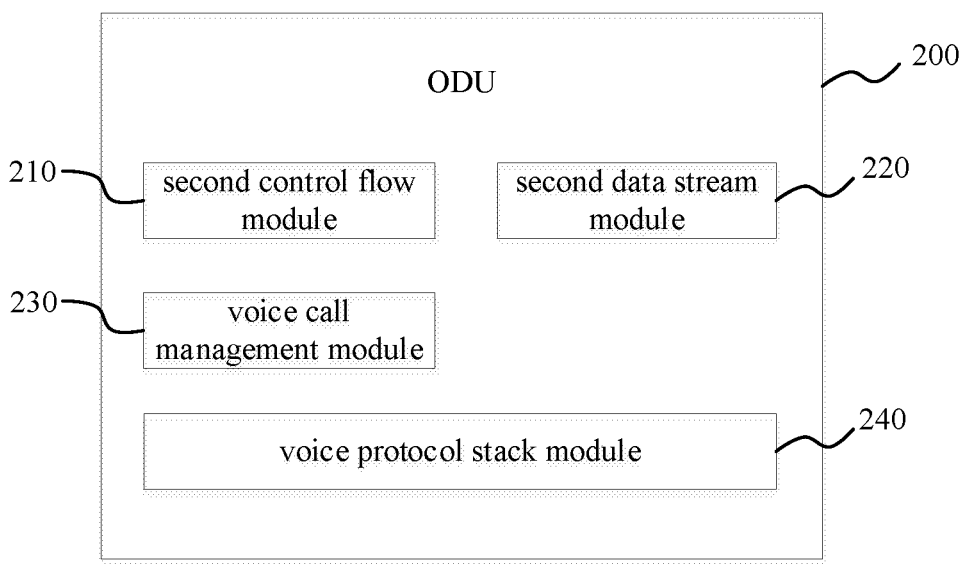
FIG. 4
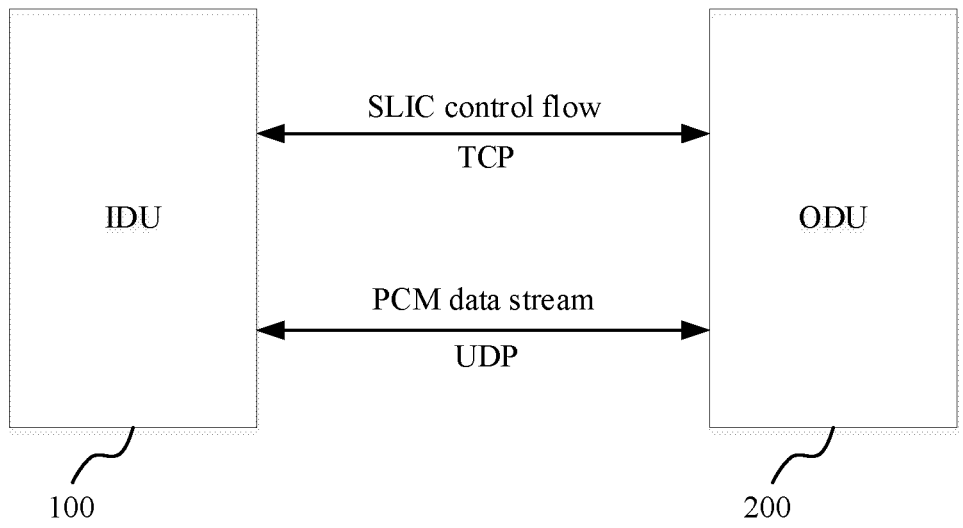
FIG. 5
| message type | message identity | message content |
|---|---|---|
FIG. 6

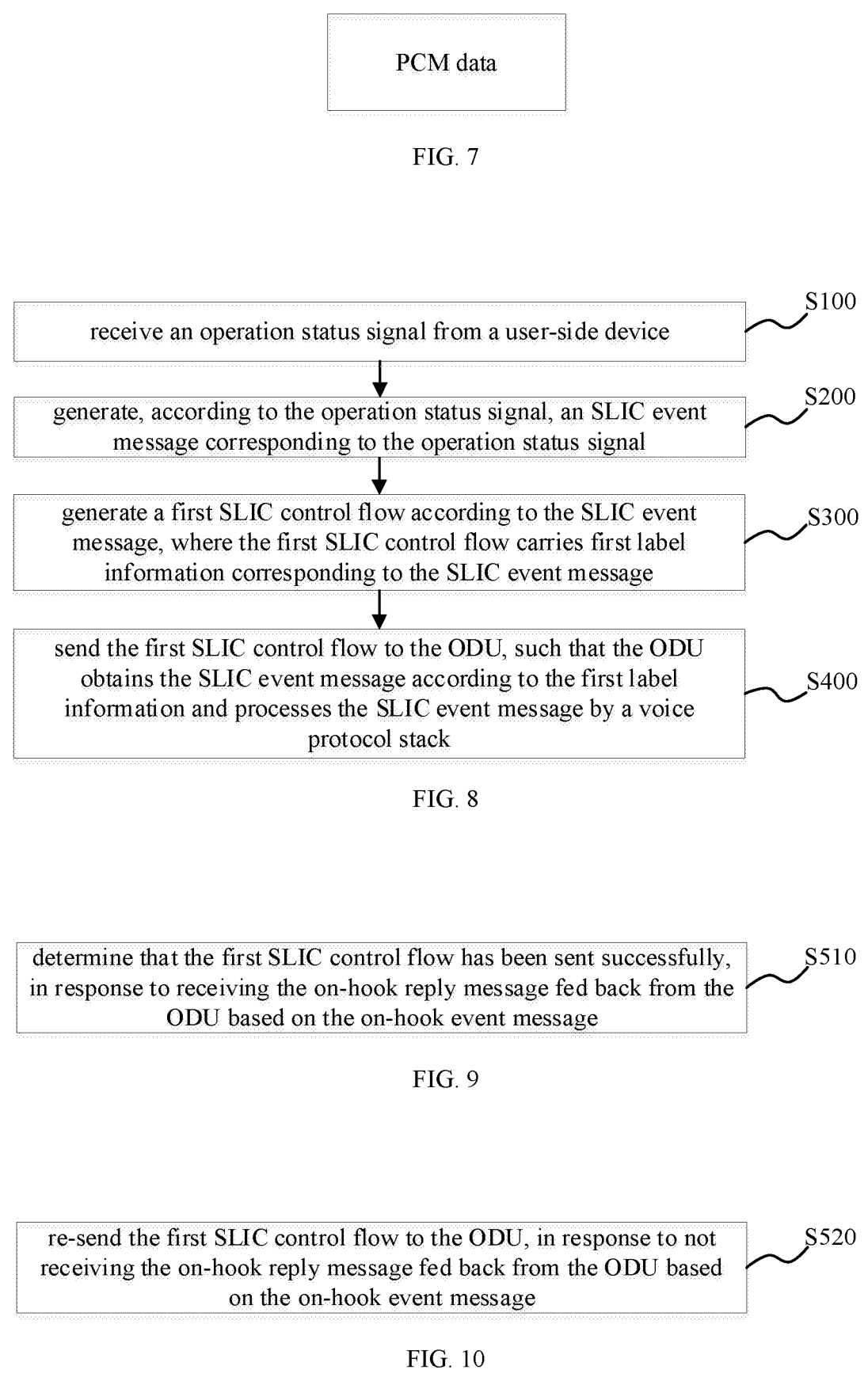

PCM data

FIG. 7 receive an operation status signal from a user-side device ~ S100 generate, according to the operation status signal, an SLIC event message corresponding to the operation status signal ~ S200 generate a first SLIC control flow according to the SLIC event message, where the first SLIC control flow carries first label information corresponding to the SLIC event message ~ S300 send the first SLIC control flow to the ODU, such that the ODU obtains the SLIC event message according to the first label information and processes the SLIC event message by a voice protocol stack ~ S400

FIG. 8 determine that the first SLIC control flow has been sent successfully, in response to receiving the on-hook reply message fed back from the ODU based on the on-hook event message ~ S510

FIG. 9 re-send the first SLIC control flow to the ODU, in response to not receiving the on-hook reply message fed back from the ODU based on the on-hook event message ~ S520

FIG. 10

S610 send an SLIC event message to the ODU

C110 determine whether the operation is an on-hook event

Yes

No

C120 determine whether an on-hook reply message from the ODU side is received

Yes

No

C130 determine whether a quantity of re-sendings exceeds 300

No

Yes

S620 delay for 1 second

S630 end

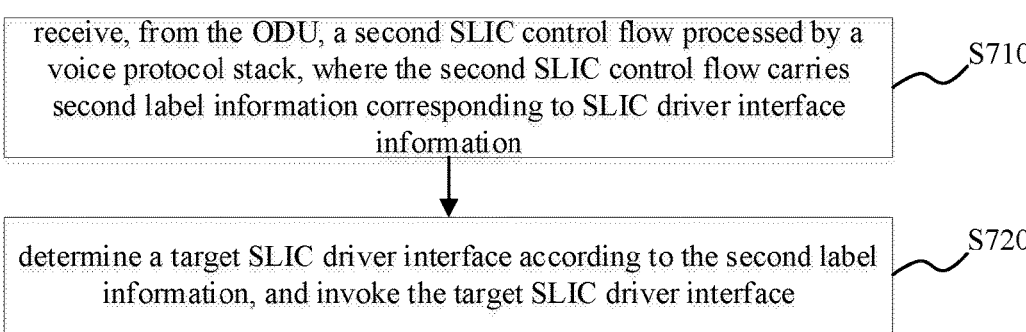

receive, from the ODU, a second SLIC control flow processed by a voice protocol stack, where the second SLIC control flow carries second label information corresponding to SLIC driver interface information ~S710 determine a target SLIC driver interface according to the second label information, and invoke the target SLIC driver interface ~S720

FIG. 12

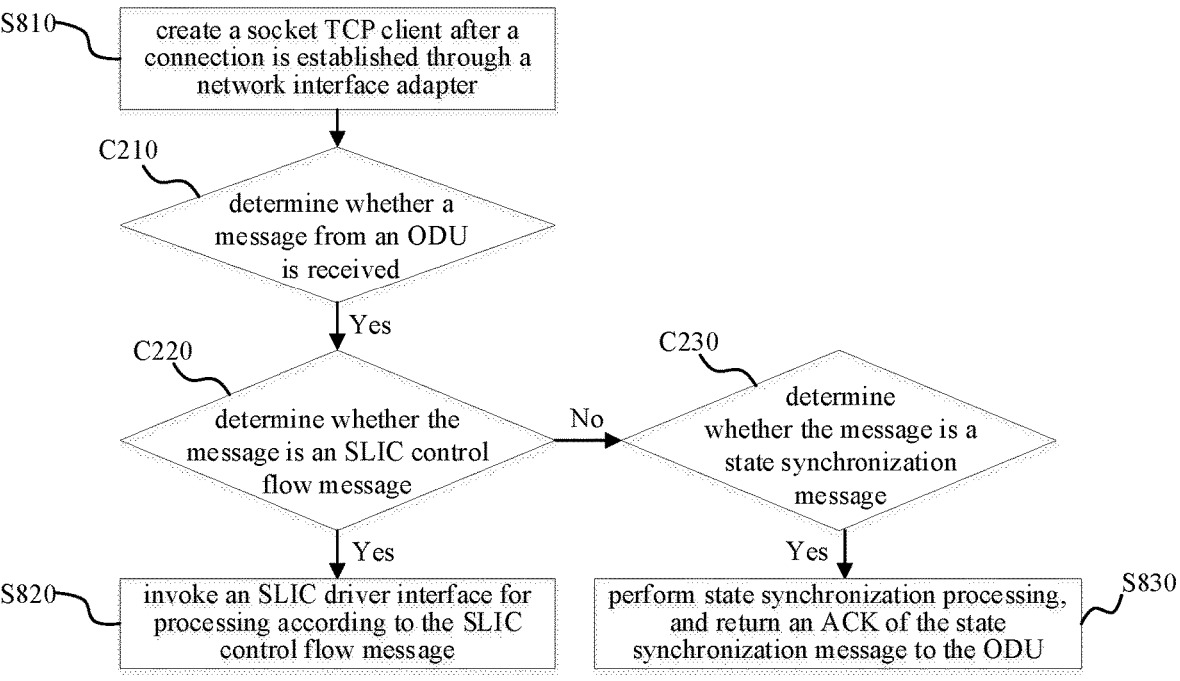

S810 — create a socket TCP client after a connection is established through a network interface adapter C210 — determine whether a message from an ODU is received Yes C220 — determine whether the message is an SLIC control flow message No C230 — determine whether the message is a state synchronization message Yes S820 — invoke an SLIC driver interface for processing according to the SLIC control flow message Yes perform state synchronization processing, and return an ACK of the state synchronization message to the ODU ~S830

FIG. 13 generate a second SLIC control flow reply message according to the second SLIC control flow, and send the second SLIC control flow reply message to the ODU ~S900

FIG. 14

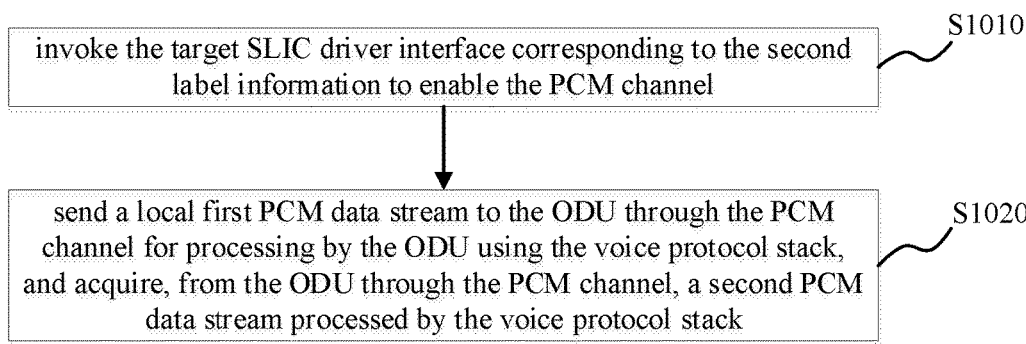

invoke the target SLIC driver interface corresponding to the second label information to enable the PCM channel                    S1010 send a local first PCM data stream to the ODU through the PCM channel for processing by the ODU using the voice protocol stack, and acquire, from the ODU through the PCM channel, a second PCM data stream processed by the voice protocol stack                    S1020

FIG. 15

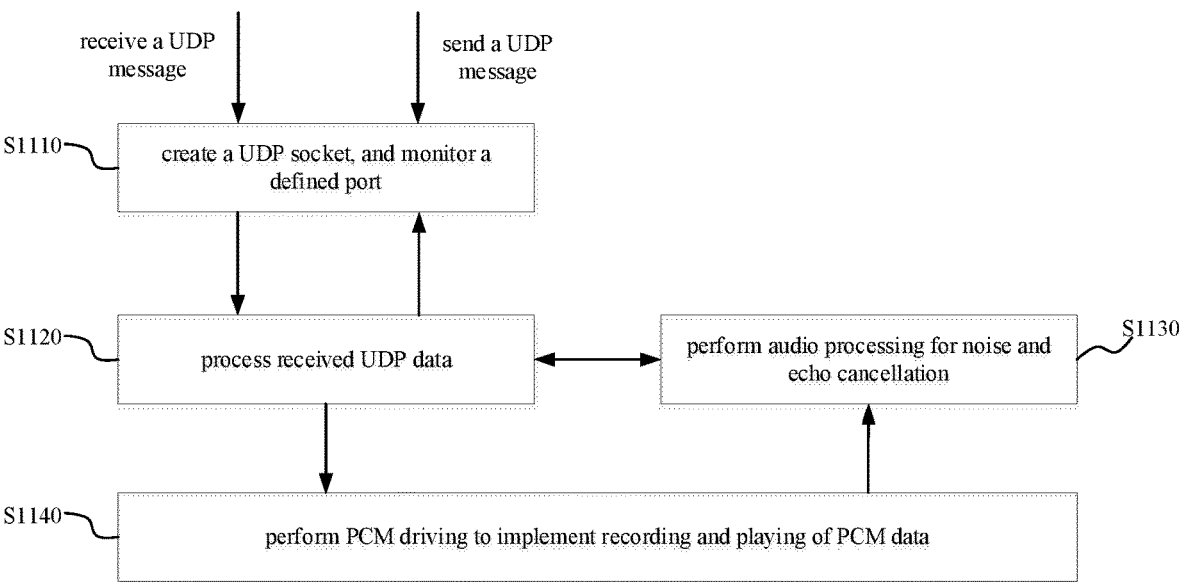

receive a UDP message          send a UDP message

S1110          create a UDP socket, and monitor a defined port

S1120          process received UDP data          perform audio processing for noise and echo cancellation          S1130

S1140          perform PCM driving to implement recording and playing of PCM data

FIG. 16

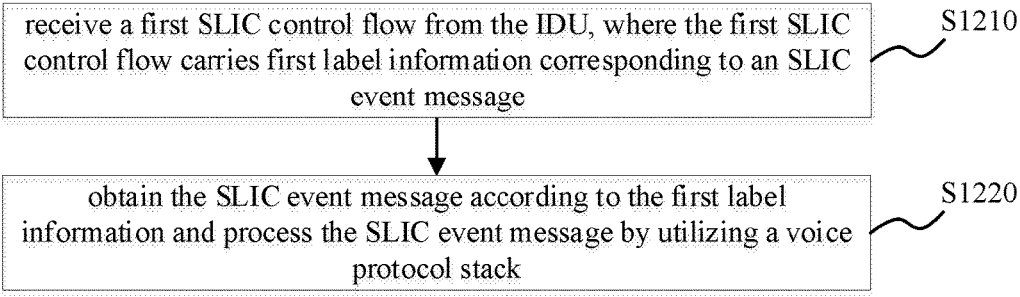

receive a first SLIC control flow from the IDU, where the first SLIC control flow carries first label information corresponding to an SLIC event message                    S1210 obtain the SLIC event message according to the first label information and process the SLIC event message by utilizing a voice protocol stack                    S1220

FIG. 17

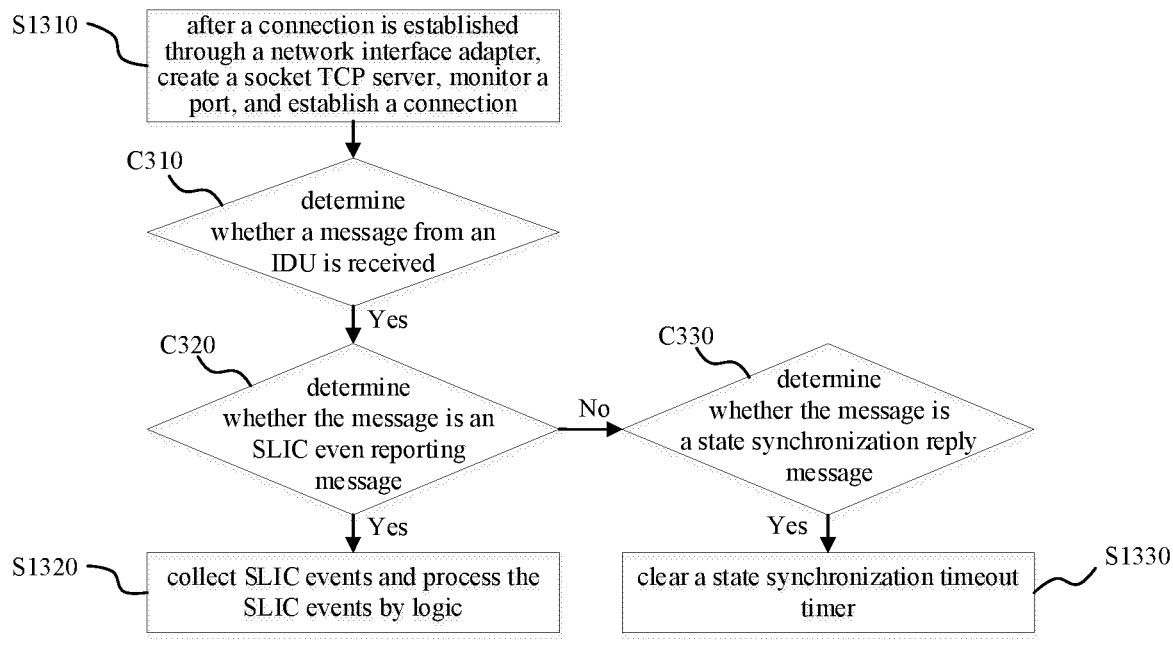

FIG. 18 generate an on-hook reply message according to the on-hook event message, and send the on-hook reply message to the IDU
S1400

FIG. 19 acquire a second SLIC control flow processed by a voice protocol stack, where the second SLIC control flow carries second label information corresponding to SLIC driver interface information
S1510 send the second SLIC control flow to the IDU such that the IDU determines a target SLIC driver interface according to the second label information and invokes the target SLIC driver interface
S1520

FIG. 20 determine that the second SLIC control flow has been sent successfully, in response to receiving a second SLIC control flow reply message fed back from the IDU based on the second SLIC control flow
S1610

FIG. 21 re-send the second SLIC control flow to the IDU, in response to not receiving a second SLIC control flow reply message fed back from the IDU based on the second SLIC control flow      S1620

FIG. 22

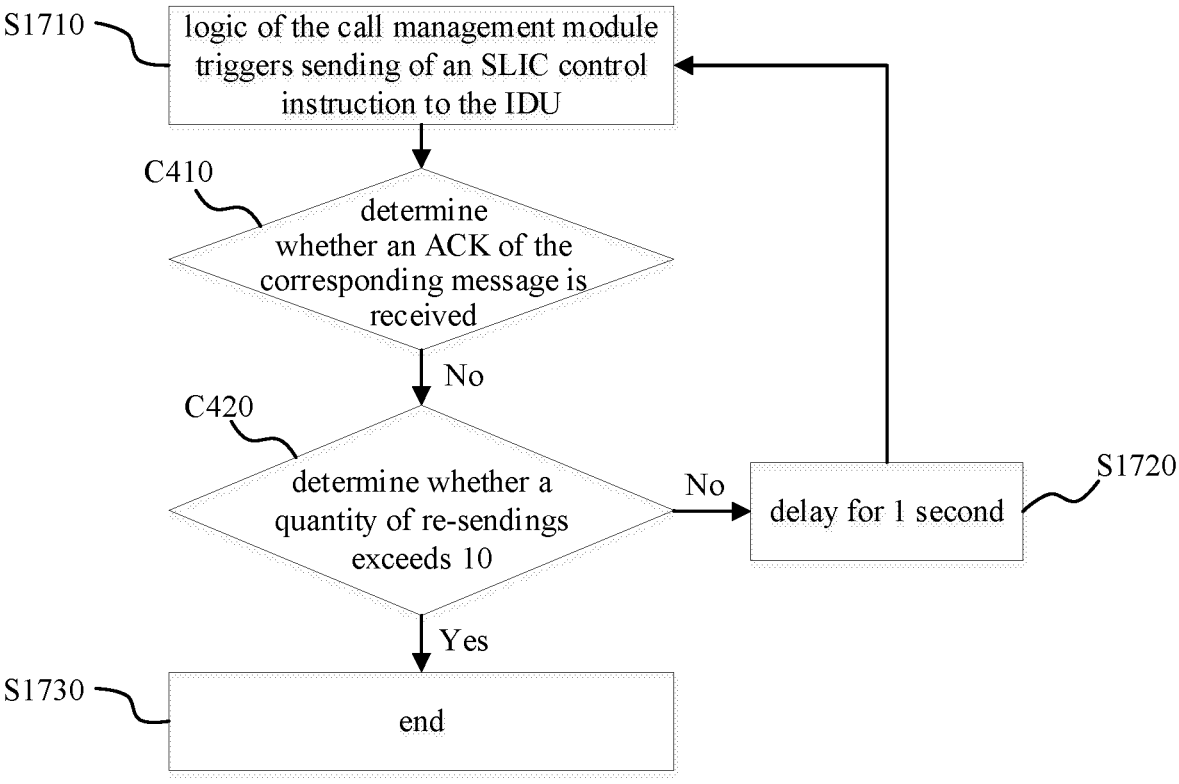

S1710 — logic of the call management module triggers sending of an SLIC control instruction to the IDU

C410 determine whether an ACK of the corresponding message is received

No

C420 determine whether a quantity of re-sendings exceeds 10

No → delay for 1 second      S1720

Yes

S1730 — end

FIG. 23

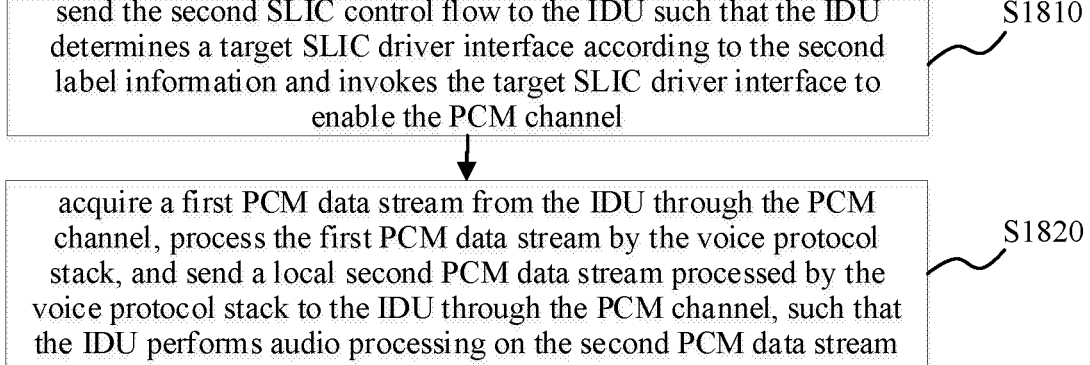

send the second SLIC control flow to the IDU such that the IDU determines a target SLIC driver interface according to the second label information and invokes the target SLIC driver interface to enable the PCM channel      S1810 acquire a first PCM data stream from the IDU through the PCM channel, process the first PCM data stream by the voice protocol stack, and send a local second PCM data stream processed by the voice protocol stack to the IDU through the PCM channel, such that the IDU performs audio processing on the second PCM data stream      S1820

DATA PROCESSING METHOD, OUTDOOR UNIT, INDOOR UNIT AND COMPUTER-READABLE STORAGE MEDIUM

CROSS-REFERENCE TO RELATED APPLICATION

The present disclosure is a national stage filing under 35 U.S.C. § 371 of international application number PCT/CN2022/086672, filed Apr. 13, 2022, which claims priority to Chinese patent application No. 202110607747.3 filed Jun. 1, 2021. The entire contents of these applications are incorporated herein by reference.

TECHNICAL FIELD

Embodiments of the present disclosure relate to, but not limited to, the technical field of communication, and in particular, to a data processing method, an Outdoor Unit (ODU), an Indoor Unit (IDU), and a computer-readable storage medium.

BACKGROUND

At present, to solve the problem of small coverage of 5th Generation (5G) networks, Customer Premise Equipment (CPE) products integrating an Indoor Unit (IDU) and an Outdoor Unit (ODU) have been launched in the market. The IDU and the ODU in an outdoor CPE product are connected by a network cable, so that a Subscriber Line Interface Circuit (SLIC) chip cannot be directly connected from the IDU to the ODU through a hardwired connection. For existing CPE products in the market, the SLIC chip and a voice protocol stack are configured on the IDU. As a result, the protocol stack of the voice function on the ODU is abandoned, and the protocol stack needs to be re-implemented on the IDU. This requires heavy workload and is not inheritable. In addition, because the interaction between the Voice over New Radio (VoNR)/Voice over Long Term Evolution (VOLTE) protocol stack and the 5G/LTE protocol stack is involved, a large quantity of interfaces are involved and cannot be unified, making it difficult to realize the mutual compatibility between the IDU and the ODU.

SUMMARY

The following is a summary of the subject matter set forth in this description. This summary is not intended to limit the scope of protection of the claims.

Embodiments of the present disclosure provide a data processing method, an outdoor unit, an indoor unit, and a computer-readable storage medium.

In accordance with a first aspect of the present disclosure, an embodiment provides a data processing method performed by an IDU communicating with an ODU. The method may include: receiving an operation status signal from a user-side device; generating, according to the operation status signal, an SLIC event message corresponding to the operation status signal; generating a first SLIC control flow according to the SLIC event message, where the first SLIC control flow carries first label information corresponding to the SLIC event message; and sending the first SLIC control flow to the ODU, such that the ODU obtains the SLIC event message according to the first label information and processes the SLIC event message by utilizing a voice protocol stack.

In accordance with a second aspect of the present disclosure, an embodiment provides a data processing method performed by an IDU communicating with an ODU. The method may include: receiving, from the ODU, a second SLIC control flow processed by utilizing a voice protocol stack, where the second SLIC control flow carries second label information corresponding to a target SLIC driver interface; and determining the target SLIC driver interface according to the second label information, and invoking the target SLIC driver interface.

In accordance with a third aspect of the present disclosure, an embodiment provides a data processing method performed by an ODU communicating with an IDU. The method may include: receiving a first SLIC control flow from the IDU, where the first SLIC control flow carries first label information corresponding to an SLIC event message; and obtaining the SLIC event message according to the first label information and processing the SLIC event message by utilizing a voice protocol stack.

In accordance with a fourth aspect of the present disclosure, an embodiment provides a data processing method performed by an ODU communicating with an IDU. The method may include: acquiring a second SLIC control flow processed by utilizing a voice protocol stack, where the second SLIC control flow carries second label information corresponding to a target SLIC driver interface; and sending the second SLIC control flow to the IDU, such that the IDU determines the target SLIC driver interface according to the second label information, and invokes the target SLIC driver interface.

In accordance with a fifth aspect of the present disclosure, an embodiment provides an IDU which may include: a memory, a processor, and a computer program stored in the memory and executable by the processor, where the computer program, when executed by the processor, causes the processor to implement the data processing method in accordance with the first aspect or the second aspect.

In accordance with a sixth aspect of the present disclosure, an embodiment provides an ODU which may include: a memory, a processor, and a computer program stored in the memory and executable by the processor, where the computer program, when executed by the processor, causes the processor to implement the data processing method in accordance with the third aspect or the fourth aspect.

In accordance with a seventh aspect of the present disclosure, an embodiment provides a computer-readable storage medium, storing a computer-executable instruction which, when executed by a processor, causes the processor to implement the data processing method in accordance with any one of the first aspect to the fourth aspect.

Additional features and advantages of the present disclosure will be set forth in the subsequent specification, and partly become apparent from the specification, or may be learned by the practice of the present disclosure. The objectives and other advantages of the present disclosure can be realized and obtained by the structures particularly pointed out in the specification, claims, and accompanying drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and not intended to the technical schemes of the present disclosure.

FIG. 4 is an architectural diagram of functional blocks of the ODU according to an embodiment of the present disclosure;

FIG. 5 is a schematic diagram showing message exchange between the IDU and the ODU according to an embodiment of the present disclosure;

FIG. 6 is a schematic diagram of a structure of an SLIC control flow message between the IDU and the ODU according to an embodiment of the present disclosure;

FIG. 7 is a schematic diagram of a structure of a Pulse Code Modulation (PCM) data stream message between the IDU and the ODU according to an embodiment of the present disclosure;

FIG. 8 is a flowchart of a data processing method where the IDU sends a first SLIC control flow to the ODU according to an embodiment of the present disclosure;

FIG. 9 is a flowchart of a case where the IDU receives an on-hook reply message when an SLIC event message is an on-hook event message according to an embodiment of the present disclosure;

FIG. 10 is a flowchart of a case where the IDU does not receive an on-hook reply message when an SLIC event message is an on-hook event message according to an embodiment of the present disclosure;

FIG. 12 is a flowchart of a data processing method where the IDU receives a second SLIC control flow from the ODU according to an embodiment of the present disclosure;

FIG. 13 is a detailed flowchart of receiving the second SLIC control flow by the IDU side according to an embodiment of the present disclosure;

FIG. 14 is a flowchart of feeding back a second SLIC control flow reply message to the ODU by the IDU according to the second SLIC control flow according to an embodiment of the present disclosure;

FIG. 15 is a flowchart of processing a PCM data stream performed by the IDU side after the IDU enables a PCM channel according to an embodiment of the present disclosure.

FIG. 16 is a detailed flowchart of exchanging PCM data by the IDU side according to an embodiment of the present disclosure;

FIG. 17 is a flowchart of receiving a first SLIC control flow from the IDU by the ODU according to an embodiment of the present disclosure;

FIG. 18 is a detailed flowchart of receiving a first SLIC control flow from the IDU by the ODU according to an embodiment of the present disclosure;

FIG. 19 is a flowchart of feeding back an on-hook reply message according to an on-hook event message by the ODU according to an embodiment of the present disclosure;

FIG. 20 is a flowchart of sending a second SLIC control flow to the IDU from the ODU according to an embodiment of the present disclosure;

FIG. 21 is a flowchart of data processing when the ODU receives the second SLIC control flow reply message according to an embodiment of the present disclosure;

FIG. 22 is a flowchart of data processing when the ODU does not receive the second SLIC control flow reply message according to an embodiment of the present disclosure;

FIG. 23 is a flowchart of message sending processing on an ODU side according to an embodiment of the present disclosure;

FIG. 24 is a flowchart of processing a PCM data stream by the ODU side after the IDU enables a PCM channel according to an embodiment of the present disclosure.

DETAILED DESCRIPTION

Figure 1:
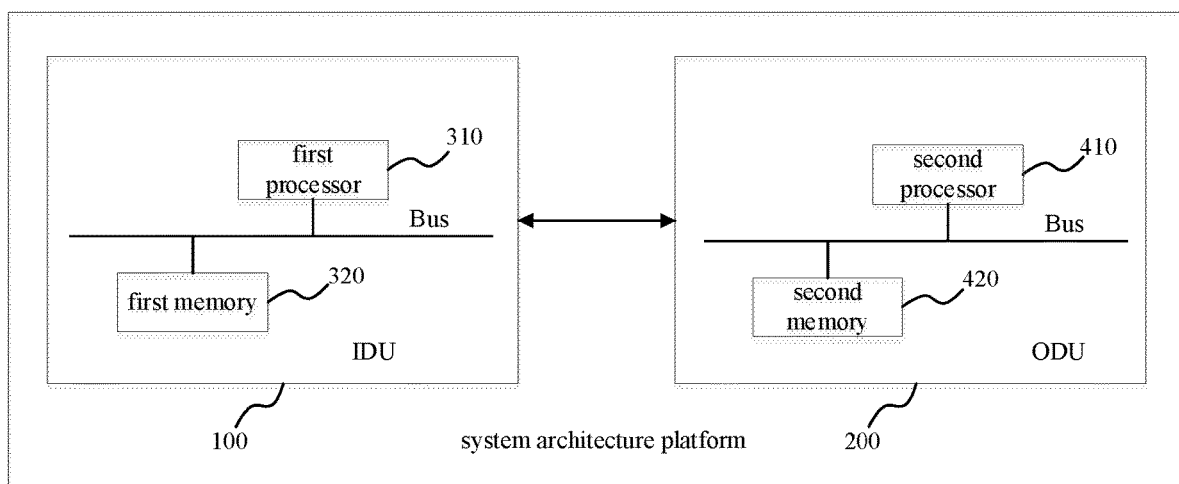
FIG. 1 is a schematic diagram of a system architecture platform configured for executing a data processing method between an IDU and an ODU according to an embodiment of the present disclosure.

Objectives, technical schemes, and advantages of the present disclosure will be clearer from a detailed description of embodiments of the present disclosure in conjunction with accompanying drawings. It should be understood that the specific embodiments described herein are merely illustrative of the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

In some cases, at present, to solve the problem of small coverage of 5G networks, CPE products integrating an IDU and an ODU have been launched in the market. The IDU and the ODU in an outdoor CPE product are connected by a network cable, so that an SLIC chip cannot be directly connected from the IDU to the ODU through a hardwired connection. For existing CPE products in the market, the SLIC chip and a voice protocol stack are configured on the IDU. As a result, the protocol stack of the voice function on the ODU is abandoned, and the protocol stack needs to be re-implemented on the IDU. This requires heavy workload and is not inheritable. In addition, because the interaction between the VONR/VOLTE protocol stack and the 5G/LTE protocol stack is involved, a large quantity of interfaces are involved and cannot be unified, making it difficult to realize the mutual compatibility between the IDU and the ODU.

In view of the above cases, embodiments of the present disclosure provide a data processing method, an outdoor unit, an indoor unit, and a computer-readable storage medium. In the embodiments of the present disclosure, based on an 5G outdoor CPE product architecture where an SLIC chip is located in an IDU and a voice protocol stack is located in an ODU, a function of the voice protocol stack is migrated to the ODU to weaken a function of the IDU, which is in turn used as an adaptation layer between a user-side device and the ODU, and a data format is agreed between the IDU and the ODU, such that they are able to send and receive data according to the agreed data format. Interaction data involved is universal and basic data, and no specific service logic is involved. In the embodiments of the present disclosure, service logic and a protocol stack part of a voice function are implemented on the ODU side. Therefore, according to the technical schemes of the embodiments of the present disclosure, the data structure and the interaction process between the ODU and the IDU are simple and clear, and the number of the interaction interfaces between the IDU and the ODU are reduced, thereby facilitating the interface standardization between the IDU and the ODU, such that IDUs and ODUs can be cross-paired for use. In addition, the realization of the voice service logic on the ODU side is ensured to the greatest extent, thereby facilitating the popularization of the voice function and improving the stability of the voice function.

The embodiments of the present disclosure will be further described in detail below with reference to the accompanying drawings.

As shown in FIG. 1, FIG. 1 is a schematic diagram of a system architecture platform configured for executing a data processing method according to an embodiment of the present disclosure.

In the example of FIG. 1, the system architecture platform includes an IDU 100 and an ODU 200. The IDU 100 includes a first processor 310 and a first memory 320. The ODU 200 includes a second processor 410 and a second memory 420. The first processor 310 and the first memory 320 may be connected by a bus or in other ways. The second processor 410 and the second memory 420 may be connected by a bus or in other ways. Connection by a bus is used as an example in FIG. 1.

Each of the first memory 320 and the second memory 420, as a non-transitory computer-readable storage medium, may be configured for storing a non-transitory software program and a non-transitory computer-executable program. In addition, each of the first memory 320 and the second memory 420 may include a high-speed random access memory, and may also include a non-transitory memory, e.g., at least one magnetic disk storage device, flash memory device, or other non-transitory solid-state storage device. In some implementations, the first memory 320 may include memories located remotely from the first processor 310, and the second memory 420 may include memories located remotely from the second processor 410. These remote memories may be connected to the system architecture platform via a network. Examples of the network include, but not limited to, the Internet, an intranet, a local area network, a mobile communication network, and combinations thereof.

It can be understood by those having ordinary skills in the art that the system architecture platform may be applied to a 3$^{rd}$ Generation (3G) communication network system, an LTE communication network system, a 5G communication network system, future evolved mobile communication network systems, etc., which is not particularly limited in this embodiment.

Those having ordinary skills in the art may understand that the system architecture platform shown in FIG. 1 does not constitute a limitation to the embodiments of the present disclosure, and more or fewer components than those shown in the figure may be included, or some components may be combined, or a different component arrangement may be used.

In the system architecture platform shown in FIG. 1, for the IDU 100 side, the first processor 310 may invoke a data processing program stored in the first memory 320 to execute a data processing method. For the ODU 200 side, the second processor 410 may invoke a data processing program stored in the second memory 420 to execute a data processing method.

Figure 2:
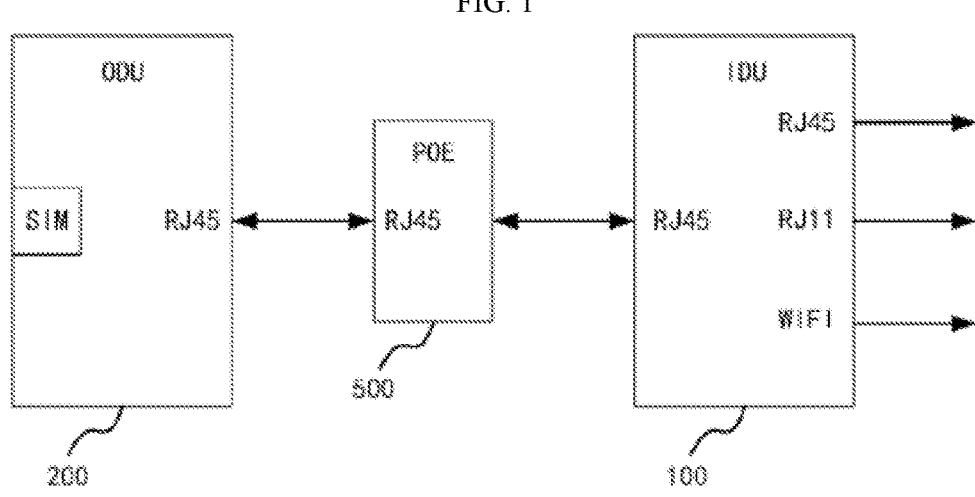
FIG. 2 is a diagram showing a connection relationship between the IDU and the ODU according to an embodiment of the present disclosure.
Figure 3:
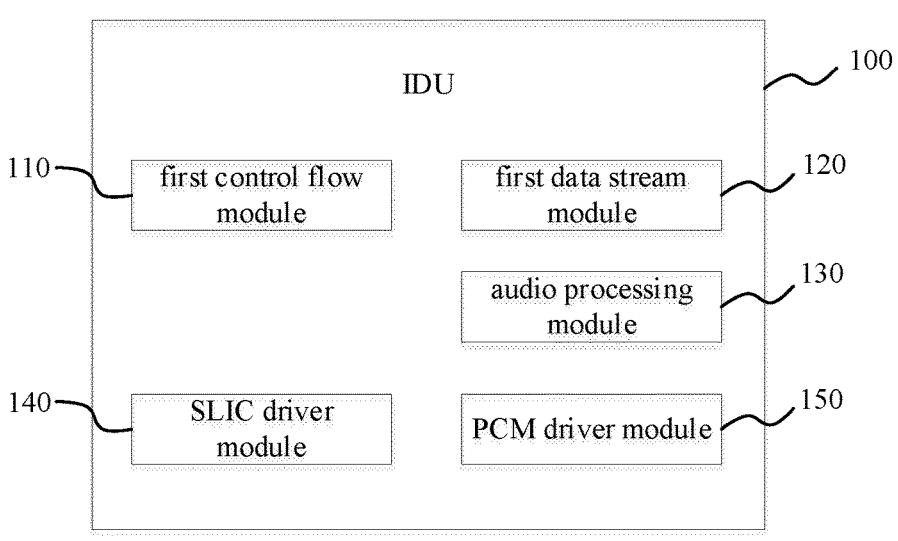
FIG. 3 is an architectural diagram of functional blocks of the IDU according to an embodiment of the present disclosure.

In addition, for specific application scenarios of the data processing methods in the embodiments of the present disclosure, reference may be made to FIG. 2 to FIG. 4. FIG. 2 is a diagram showing a connection relationship between the IDU and the ODU according to an embodiment of the present disclosure. FIG. 3 is an architectural diagram of functional blocks of the IDU according to an embodiment of the present disclosure. FIG. 4 is an architectural diagram of functional blocks of the ODU according to an embodiment of the present disclosure.

As shown in FIG. 2, for an outdoor CPE product, the IDU 100 and the ODU 200 are connected through a Power Over Ethernet (POE) 500 that can supply power and provide data transmission for the ODU 200, and can also provide data transmission for the IDU 100. The IDU 100 can provide user interfaces, mainly Wi-Fi, an RJ11 port, an RJ45 port, and an indicator light. The ODU 200, as a wireless communication module, can provide a data channel and a voice function for the IDU 100.

In addition, as shown in FIG. 3, the IDU 100 mainly includes the following functional modules: a first control flow module 110, a first data stream module 120, an audio processing module 130, an SLIC driver module 140, and a PCM driver module 150. Based on the above functional modules, the IDU 100 is mainly configured to exchange phone events and voice data with the ODU 200, realize SLIC driving and PCM driving, and implement echo cancellation and noise reduction.

In addition, as shown in FIG. 4, the ODU 200 mainly includes the following functional modules: a second control flow module 210, a second data stream module 220, a voice call management module 230, and a voice protocol stack module 240. Based on the above functional modules, the ODU 200 is mainly configured to exchange phone events and voice data with the IDU 100, and implement voice service logic and a voice protocol stack.

Based on the above system architecture platform and application scenarios, as shown in FIG. 5, FIG. 5 is a schematic diagram showing message exchange between the IDU and the ODU according to an embodiment of the present disclosure. In the embodiments of the present disclosure, the message exchange between the IDU and the ODU involves two aspects: SLIC control flow and PCM data stream. In addition, as shown in FIG. 5, to meet requirements for the transmission reliability of the SLIC control flow and the low transmission latency of the PCM data stream, the SLIC control flow may be sent and received in a Transmission Control Protocol (TCP) mode, and the PCM data stream may be sent and received in a User Datagram Protocol (UDP) mode in the embodiments of the present disclosure.

To realize the data exchange between the IDU and the ODU, a structure of an SLIC control flow message between the IDU and the ODU is defined according to the characteristics of the voice function in the embodiments of the present disclosure. As shown in FIG. 6, the structure of the SLIC control flow message may include, but not limited to, a message type field, a message identity field, and a message content field.

The message type field in the structure of the SLIC control flow message includes, but not limited to, request and reply. In the embodiments of the present disclosure, characters "1" and "2" may represent a request and a reply respectively, occupying one byte, for example, 1 may represents a request and 2 may represents a reply.

In addition, the message identity field and the message content field in the structure of the SLIC control flow message can be defined as follows according to the voice function characteristics of the SLIC chip.

For an SLIC event reported by the IDU, in the embodiments of the present disclosure, 0×01 may be filled in the message identity field to indicate that currently there is an SLIC event to be reported. In addition, the SLIC event may include an off-hook event, an on-hook event, a key-press event, etc. Therefore, in order to further clarify the type or content of the reported SLIC event, for example, in the embodiments of the present disclosure, 0×01 may be filled in the message content field to indicate that the currently reported SLIC event is an off-hook event, 0×02 may be filled in the message content field to indicate that the currently reported SLIC event is an on-hook event, 0×03 may be filled in the message content field to indicate that the currently reported SLIC event is a FLASH event. ASCII codes corresponding to keys 0-9, *, and # may be filled in the message content field to indicate key-press content of the currently reported key-press event.

For the SLIC control flow message received by the IDU, for example, in the embodiments of the present disclosure, 0×02 may be filled in the message identity field to indicate ringing with calling line identification presentation, and a caller number is filled in the corresponding message content. In the embodiments of the present disclosure, 0×03 may be filled in the message identity field to indicate stopping ringing, and the corresponding message content is empty. In the embodiments of the present disclosure, 0×04 may be filled in the message identity field to indicate playing a prompt tone. In addition, the prompt tone may include a dial tone, a busy tone, a howler tone, a call waiting tone, a success prompt tone, and a failure prompt tone. Therefore, in order to further clarify the type of the prompt tone, in the embodiments of the present disclosure, 0×01 may be filled in the message content field to indicate the dial tone, 0×02 may be filled in the message content field to indicate the busy tone, 0×03 may be filled in the message content field to indicate the howler tone, 0×04 may be filled in the message content field to indicate the call waiting tone, 0×05 may be filled in the message content field to indicate the success prompt tone, and 0×06 may be filled in the message content field to indicate the failure prompt tone. In the embodiments of the present disclosure, 0×05 may be filled in the message identity field to indicate stopping playing the prompt tone, and the corresponding message content is empty. In the embodiments of the present disclosure, 0×06 may be filled in the message identity field to indicate enabling a PCM channel, and the corresponding message content is empty. In the embodiments of the present disclosure, 0×07 may be filled in the message identity field to indicate disabling a PCM channel, and the corresponding message content is empty. In the embodiment of the present disclosure, 0×08 may be filled in the message identity field to indicate a synchronization message, and the corresponding message content is empty.

In addition, a structure of an PCM data stream message between the IDU and the ODU may be defined in the embodiments of the present disclosure. As shown in FIG. 7, the structure of the PCM data stream message may include, but not limited to, a PCM data field. It may be defined that PCM data is sent and received between the IDU and the ODU at intervals of 20 ms. PCM data is encoded with a sampling rate of 8K in 16-bit format, so that each packet of PCM data has a size of 320 bytes.

Based on the above-mentioned system architecture platform, application scenarios, and agreed message structures, various embodiments of the data processing method of the present disclosure are provided.

As shown in FIG. 8, FIG. 8 is a flowchart of a data processing method where the IDU sends a first SLIC control flow to the ODU according to an embodiment of the present disclosure. The method is applied to the IDU and includes, but not limited to, the following steps S100, S200, S300, and S400.

At S100, an operation status signal from a user-side device is received.

At S200, an SLIC event message corresponding to the operation status signal is generated according to the operation status signal.

At S300, a first SLIC control flow is generated according to the SLIC event message where the first SLIC control flow carries first label information corresponding to the SLIC event message.

At S400, the first SLIC control flow is sent to the ODU, such that the ODU obtains the SLIC event message according to the first label information and processes the SLIC event message by utilizing a voice protocol stack.

For example, for the IDU side, when a user performs an operation on the user-side device such as a phone, the IDU receives an operation status signal from the user-side device and acquires a current SLIC event message according to the operation status signal. To transparently transmit the SLIC event message to the ODU, the IDU converts the SLIC event message into first label information which is carried in the first SLIC control flow, thereby sending the SLIC event message to the ODU through the first SLIC control flow. In this way, the ODU can obtain the SLIC event message according to the first label information and process the SLIC event message by utilizing the voice protocol stack.

It should be noted that the above operation status signal includes, but not limited to, an off-hook state signal, an on-hook state signal, or a key-press state signal. In addition, the first label information includes, but not limited to, a first message identity characterizing the reported SLIC event message, and first message content characterizing data content or a type of the reported SLIC event message.

For example, when the operation status signal is the on-hook state signal, the SLIC event message is an on-hook event message accordingly. Therefore, the first message identity in the first label information is 0×01 according to the agreed data format, and the first message content is 0×02 according to the agreed data format.

In addition, as shown in FIG. 9 to FIG. 10, FIG. 9 is a flowchart of a case where the IDU receives an on-hook reply message when an SLIC event message is an on-hook event message according to an embodiment of the present disclosure, and FIG. 10 is a flowchart of a case where the IDU does not receive the on-hook reply message when an SLIC event message is an on-hook event message according to an embodiment of the present disclosure.

As shown in FIG. 9, when the SLIC event message is an on-hook event message, the data processing method in this embodiment of the present disclosure further includes, but not limited to, a step S510.

At S510, it is determined that the first SLIC control flow has been sent successfully when the on-hook reply message fed back from the ODU based on the on-hook event message is received.

As shown in FIG. 10, when the SLIC event message is an on-hook event message, the data processing method of this embodiment of the present disclosure further includes, but not limited to, a step S520.

At S520, the first SLIC control flow is re-sent to the ODU when the on-hook reply message fed back from the ODU based on the on-hook event message is not received.

Figure 11:
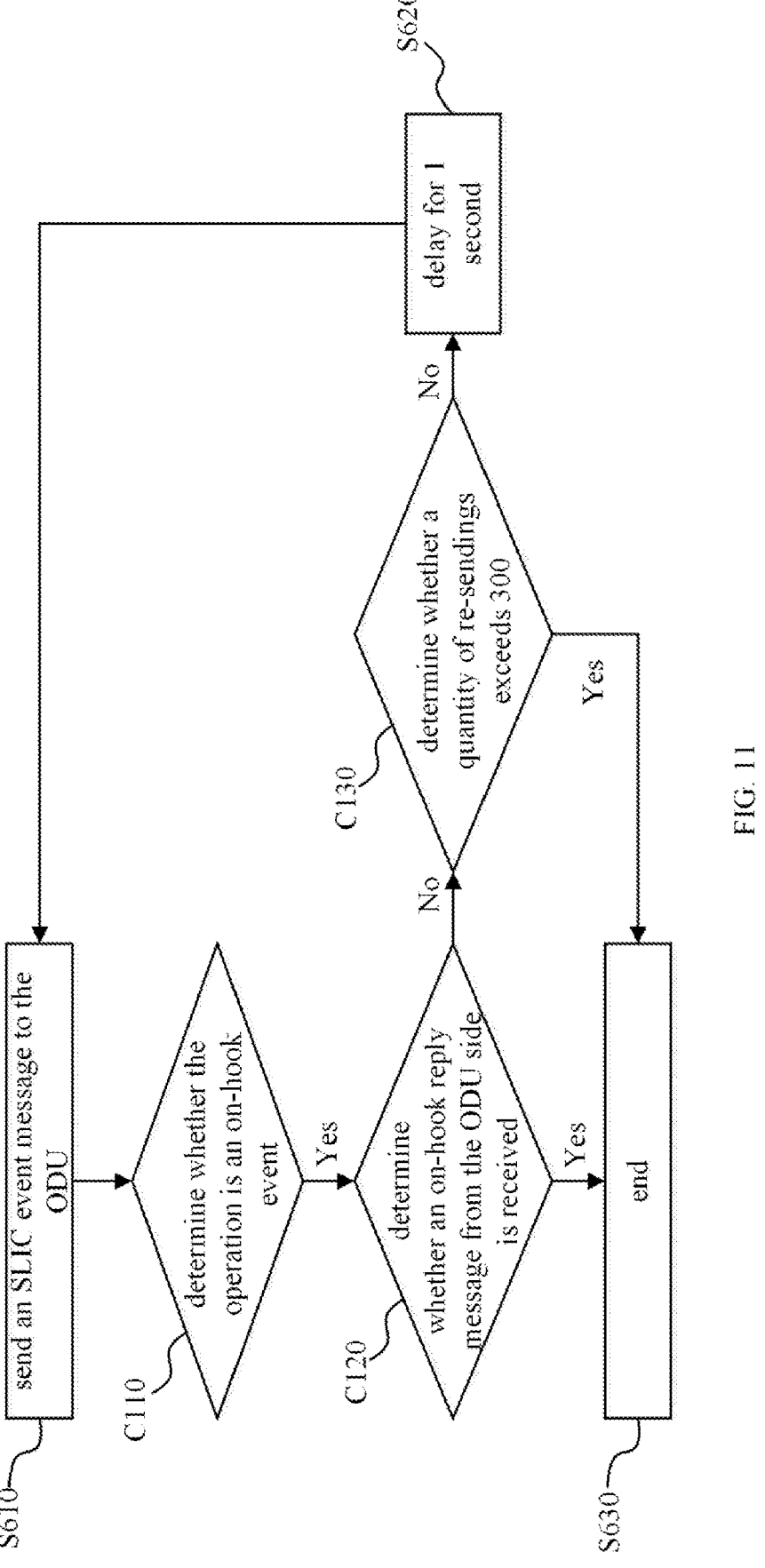
FIG. 11 is a flowchart of processing which the user at an IDU side performs on a phone according to an embodiment of the present disclosure.

Based on the above flowcharts in FIG. 8 to FIG. 10, as shown in FIG. 11, FIG. 11 is a flowchart of processing which the user at the IDU side performs on the phone. A process includes, but not limited to, steps S610, C110, C120, C130, S620, and S630.

At S610, an SLIC event message is sent to the ODU. After the user performs an operation such as an off-hook, on-hook, or key-press operation on the telephone, an SLIC layer of the IDU identifies the operation and sends an SLIC event message to the ODU.

At C110, it is determined whether the operation is an on-hook event. If so, the step C120 is executed. According to the characteristics of phone events and the stability of functions, the on-hook event requires an acknowledgment (ACK) reply for determination. If the ODU side does not receive the on-hook event message sent by IDU side, the phone cannot be hung up. Further, the user on the IDU side cannot perceive this fault and therefore will not trigger an action for correcting this fault. As a result, the fault cannot be rectified. For other SLIC events such as an off-hook event, if the ODU does not receive the event message, the user cannot hear the dial tone. In this case, the user will hang up and off-hook the phone again, and the fault can be rectified. Therefore, in the embodiments of the present disclosure, only the on-hook event requires acknowledgment and re-sending.

At C120, it is determined whether the on-hook reply message from the ODU side is received. If so, the step S630 is executed; otherwise, the step C130 is executed.

At C130, it is determined whether a quantity of re-sendings exceeds 300. If so, the IDU and the ODU are considered to have been abnormally disconnected, so no re-sending is needed, and the step S630 is executed; otherwise, S620 is executed.

At S620, the hang-up event message is re-sent to the ODU with a delay of 1 second.

At S630, the process ends.

As shown in FIG. 12, FIG. 12 is a flowchart of a data processing method where the IDU receives a second SLIC control flow from the ODU according to an embodiment of the present disclosure. The method is applied to the IDU and includes, but not limited to, steps S710 and S720.

At S710, a second SLIC control flow processed by utilizing a voice protocol stack is received from the ODU, where the second SLIC control flow carries second label information corresponding to a target SLIC driver interface.

At S720, a target SLIC driver interface is determined and invoked according to the second label information, and then is invoked.

For example, for the IDU side, the IDU monitors whether the second SLIC control flow processed by the voice protocol stack is received from the outdoor unit. If the IDU receives the second SLIC control flow, the IDU determines the target SLIC driver interface according to the second label information carried in the second SLIC control flow, and invokes the target SLIC driver interface.

It should be noted that the second label information may include a second message identity, or may include a second message identity and a second message content. The second message identity represents an interface address of the invoked SLIC driver interface, and the second message content represents data content to be transmitted by the invoked SLIC driver interface.

For example, when the second SLIC control flow is used for controlling the phone to ring with calling line identification presentation, the second message identity in the second label information is 0×02 according to the agreed data format, the second message content is a caller number accordingly. The IDU invokes the SLIC driver interface according to the second label information to control the phone to perform calling line identification presentation and ringing.

Based on the above flowchart in FIG. 12, the present disclosure provides a detailed flowchart of receiving the second SLIC control flow by the IDU side. As shown in FIG. 13, a process includes, but not limited to, steps S810, C210, C220, S820, C230, and S830.

At S810, after a connection is established through a network interface adapter, a socket TCP client is created.

At C210, it is determined whether a message from the ODU is received. If so, the step C220 is executed.

At C220, it is determined whether the message is an SLIC control flow message. If so, the step S820 is executed; otherwise, the step C230 is executed.

At S820, an SLIC driver interface is invoked for processing according to the SLIC control flow message. For example, processing corresponding to the SLIC control flow message may include ringing with calling line identification presentation, stopping ringing, playing a prompt tone, stopping a prompt tone, enabling a PCM channel, or disabling a PCM channel.

At C230, it is determined whether the message is a state synchronization message. If so, the step S830 is executed.

At S830, state synchronization processing is performed, and an ACK of the state synchronization message is returned to the ODU.

In addition, as shown in FIG. 14, FIG. 14 is a flowchart of feeding back a second SLIC control flow reply message to the ODU by the IDU according to the second SLIC control flow according to an embodiment of the present disclosure. The method includes, but not limited to, a step S900.

At S900, according to the second SLIC control flow, a second SLIC control flow reply message is generated and sent to the ODU.

In addition, as shown in FIG. 15, FIG. 15 is a flowchart of processing a PCM data stream by the IDU after the IDU enables a PCM channel according to an embodiment of the present disclosure. When the second label information represents controlling the IDU to enable a PCM channel, invoking the target SLIC driver interface as described in the step S720 includes, but not limited to, steps S1010 and S1020.

At S1010, the target SLIC driver interface corresponding to the second label information is invoked to enable the PCM channel.

At S1020, a local first PCM data stream is sent to the ODU through the PCM channel so that the ODU processes the first PCM data stream using the voice protocol stack, and a second PCM data stream processed by the voice protocol stack is acquired from the ODU through the PCM channel.

Based on the above flowchart in FIG. 15, the present disclosure provides a detailed flowchart of exchanging PCM data performed by the IDU side. As shown in FIG. 16, a process includes, but not limited to, steps S1110, S1120, S1130, and S1140.

At S1110, a UDP socket is created, and a defined port is monitored for receiving and sending UDP messages.

At S1120, received UDP data is processed.

At S1130, audio processing is performed for noise and echo cancellation.

At S1140, PCM driving is performed to implement recording and playing of PCM data.

It should be noted that PCM voice data between the IDU and the ODU may be sent and received through UDP messages, or may be encoded by G.711 and then sent and received through Real-Time Transport Protocol (RTP) messages.

Based on the flowcharts on the IDU side in FIG. 8 to FIG. 16, various embodiments of the data processing method on the ODU side of the present disclosure are provided.

As shown in FIG. 17, FIG. 17 is a flowchart of receiving a first SLIC control flow from the IDU by the ODU according to an embodiment of the present disclosure. The method is applied to the ODU and includes, but not limited to, steps S1210 and S1220.

At S1210, a first SLIC control flow from the IDU is received, where the first SLIC control flow carries first label information corresponding to an SLIC event message.

At S1220, the SLIC event message is obtained according to the first label information and the SLIC event message is processed by utilizing a voice protocol stack.

It should be noted that the first label information includes, but not limited to, a first message identity representing the reported SLIC event message, and first message content representing data content of the reported SLIC event message.

It should be noted that for specific implementations of the data processing method on the ODU side according to this embodiment of the present disclosure and corresponding technical effects, reference may be made to the above embodiments of the data processing method on the IDU side.

Based on the above flowchart in FIG. 17, the present disclosure provides a detailed flowchart of receiving a first SLIC control flow from the IDU by the ODU. As shown in FIG. 18, a process includes, but not limited to, steps S1310, C310, C320, S1320, C330, and S1330.

At S1310, after a connection is established through a network interface adapter, a socket TCP server is created, a port is monitored, and a connection is established.

At C310, it is determined whether a message from the IDU is received. If so, the step C320 is executed.

At C320, it is determined whether the message is an SLIC event reporting message. If so, the step S1320 is executed; otherwise, the step C330 is executed.

At S1320, SLIC events are collected for logic processing. For example, a call management module may be used to initiate a voice call or answer a call.

At C330, it is determined whether the message is a state synchronization reply message. If so, the step S1330 is executed.

At S1330, the state synchronization reply message is received, and a state synchronization timeout timer is cleared.

It should be noted that for specific implementations of the data processing method on the ODU side according to this embodiment of the present disclosure and corresponding technical effects, reference may be made to the above embodiments of the data processing method on the IDU side.

In addition, as shown in FIG. 19, FIG. 19 is a flowchart of feeding back an on-hook reply message according to an on-hook event message by the ODU according to an embodiment of the present disclosure. When the SLIC event message is an on-hook event message, the method further includes, but not limited to, a step S1400.

At S1400, according to the on-hook event message, the on-hook reply message is generated and sent to the IDU.

It should be noted that for specific implementations of the data processing method on the ODU side according to this embodiment of the present disclosure and corresponding technical effects, reference may be made to the above embodiments of the data processing method on the IDU side.

As shown in FIG. 20, FIG. 20 is a flowchart of sending a second SLIC control flow to the IDU from the ODU according to an embodiment of the present disclosure. The method is applied to the ODU and includes, but not limited to, steps S1510 and S1520.

At S1510, a second SLIC control flow processed by utilizing a voice protocol stack is acquired, where the second SLIC control flow carries second label information corresponding to a target SLIC driver interface.

At S1520, the second SLIC control flow is sent to the IDU such that the IDU determines the target SLIC driver interface according to the second label information, and invokes the target SLIC driver interface.

It should be noted that the second label information may include a second message identity, or may include a second message identity and second message content. The second message identity represents an interface address of the invoked SLIC driver interface, and the second message content represents data content to be transmitted by the invoked SLIC driver interface.

It should be noted that for specific implementations of the data processing method on the ODU side according to this embodiment of the present disclosure and corresponding technical effects, reference may be made to the above embodiments of the data processing method on the IDU side.

In addition, as shown in FIG. 21 to FIG. 22, FIG. 21 is a flowchart of data processing when the ODU receives the second SLIC control flow reply message according to an embodiment of the present disclosure, and FIG. 22 is a flowchart of data processing when the ODU does not receive the second SLIC control flow reply message according to an embodiment of the present disclosure.

As shown in FIG. 21, when the ODU receives the second SLIC control flow reply message, the data processing method of this embodiment of the present disclosure further includes, but not limited to, a step S1610.

At S1610, it is determined that the second SLIC control flow has been sent successfully when the second SLIC control flow reply message fed back from the IDU based on the second SLIC control flow is received.

As shown in FIG. 22, when the ODU does not receive the second SLIC control flow reply message, the data processing method of this embodiment of the present disclosure further includes, but not limited to, a step S1620.

At S1620, the second SLIC control flow is re-sent to the IDU when the second SLIC control flow reply message fed back from the IDU based on the second SLIC control flow is not received.

Based on the above flowcharts in FIG. 20 to FIG. 22, as shown in FIG. 23, FIG. 23 is a flowchart of message sending processing on the ODU side. A process includes, but not limited to, steps S1710, C410, C420, S1720, and S1730.

At S1710, logic of the call management module triggers sending of an SLIC control instruction to the IDU. For example, the SLIC control instruction mainly includes ringing with calling line identification presentation, stopping ringing, playing a prompt tone, stopping a prompt tone, enabling a PCM channel, or disabling a PCM channel.

At C410, it is determined whether an ACK of the corresponding message is received. If not, the step C420 is executed. Considering that messages sent by the ODU side are all control instructions, an ACK and re-sending mechanism is used to determine whether the ACK of the corresponding message is received.

At C420, it is determined whether a quantity of re-sendings exceeds 10. If so, the step S1730 is executed; otherwise, the step S1720 is executed.

At S1720, the SLIC control instruction is re-sent with a delay of 1 second.

At S1730, the process ends.

It should be noted that for specific implementations of the data processing method on the ODU side according to this embodiment of the present disclosure and corresponding technical effects, reference may be made to the above embodiments of the data processing method on the IDU side.

As shown in FIG. 24, FIG. 24 is a flowchart of processing a PCM data stream by the ODU side after the IDU enables a PCM channel according to an embodiment of the present disclosure. When the second label information represents controlling the IDU to enable a PCM channel, the above step S1520 includes, but not limited to, steps S1810 and S1820.

At S1810, the second SLIC control flow is sent to the IDU such that the IDU determines a target SLIC driver interface according to the second label information, and invokes the target SLIC driver interface to enable the PCM channel.

At S1820, a first PCM data stream from the IDU is acquired through the PCM channel, the first PCM data stream is processed by the voice protocol stack, and a local second PCM data stream processed by the voice protocol stack is sent to the IDU through the PCM channel, such that the IDU performs audio processing on the second PCM data stream.

It should be noted that for specific implementations of the data processing method on the ODU side according to this embodiment of the present disclosure and corresponding technical effects, reference may be made to the above embodiments of the data processing method on the IDU side.

Figure 25:
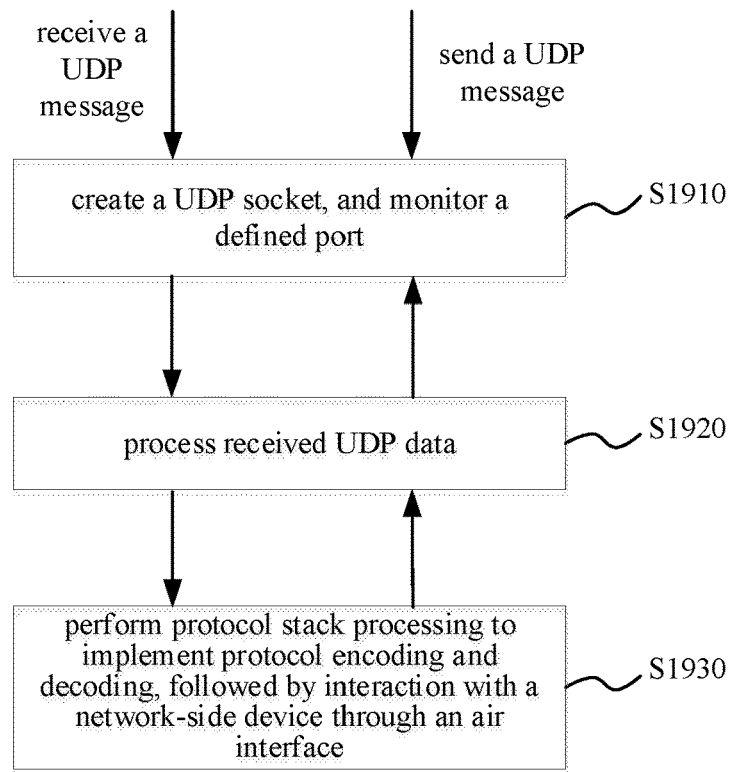
FIG. 25 is a detailed flowchart of exchanging PCM data by the ODU side according to an embodiment of the present disclosure.

Based on the above flowchart in FIG. 24, the present disclosure provides a detailed flowchart of exchanging PCM data performed by the ODU side. As shown in FIG. 25, a process includes, but not limited to, steps S1910, S1920, and S1930.

At S1910, a UDP socket is created, and a defined port is monitored for receiving and sending UDP messages.

At S1920, received UDP data is processed, or is encoded and decoded by G.711 and transmitted via the RTP protocol.

At S1930, protocol stack processing is performed to implement protocol encoding and decoding, followed by interaction with a network-side device through an air interface.

It should be noted that for specific implementations of the data processing method on the ODU side according to this embodiment of the present disclosure and corresponding technical effects, reference may be made to the above embodiments of the data processing method on the IDU side.

Figure 26:
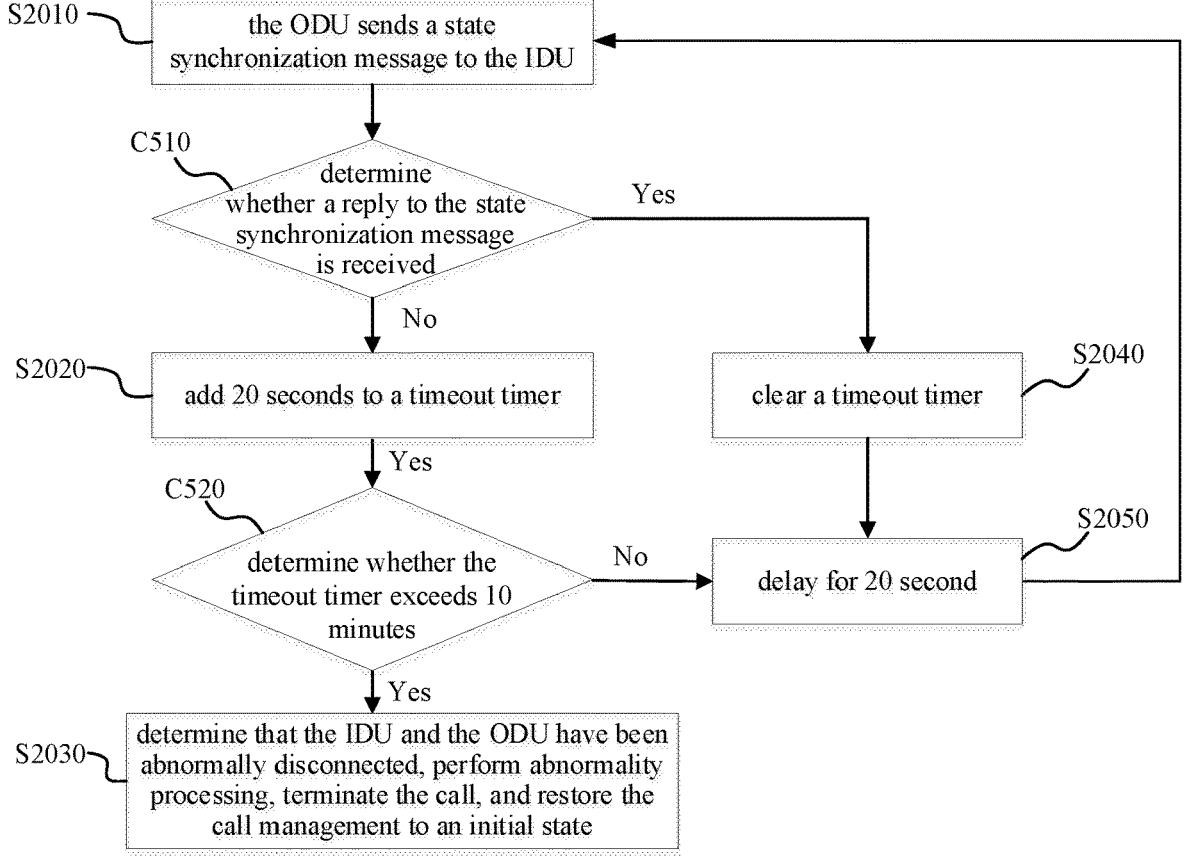
FIG. 26 is a flowchart of a state synchronization mechanism between the IDU and the ODU according to an embodiment of the present disclosure.

In addition, as shown in FIG. 26, FIG. 26 is a flowchart of a state synchronization mechanism between the IDU and the ODU. A process includes, but not limited to, steps S2010, C510, S2020, C520, S2030, S2040, and S2050.

At S2010, the ODU sends a state synchronization message to the IDU.

At C510, it is determined whether a reply to the state synchronization message is received. If not, the step S2020 is executed; otherwise, the step S2040 is executed.

At S2020, 20 seconds is added to a timeout timer, and the step C520 is executed.

At C520, it is determined whether the timeout timer exceeds 10 minutes. If so, the step S2030 is executed; otherwise, the step S2050 is executed.

At S2030, it is determined that the IDU and the ODU have been abnormally disconnected, so that abnormality processing is performed, the call is terminated, and the call management is restored to an initial state.

At S2040, the timeout timer is cleared, and the step S2050 is executed.

At S2050, the state synchronization message is periodically sent with a delay of 20 seconds.

Figure 27:
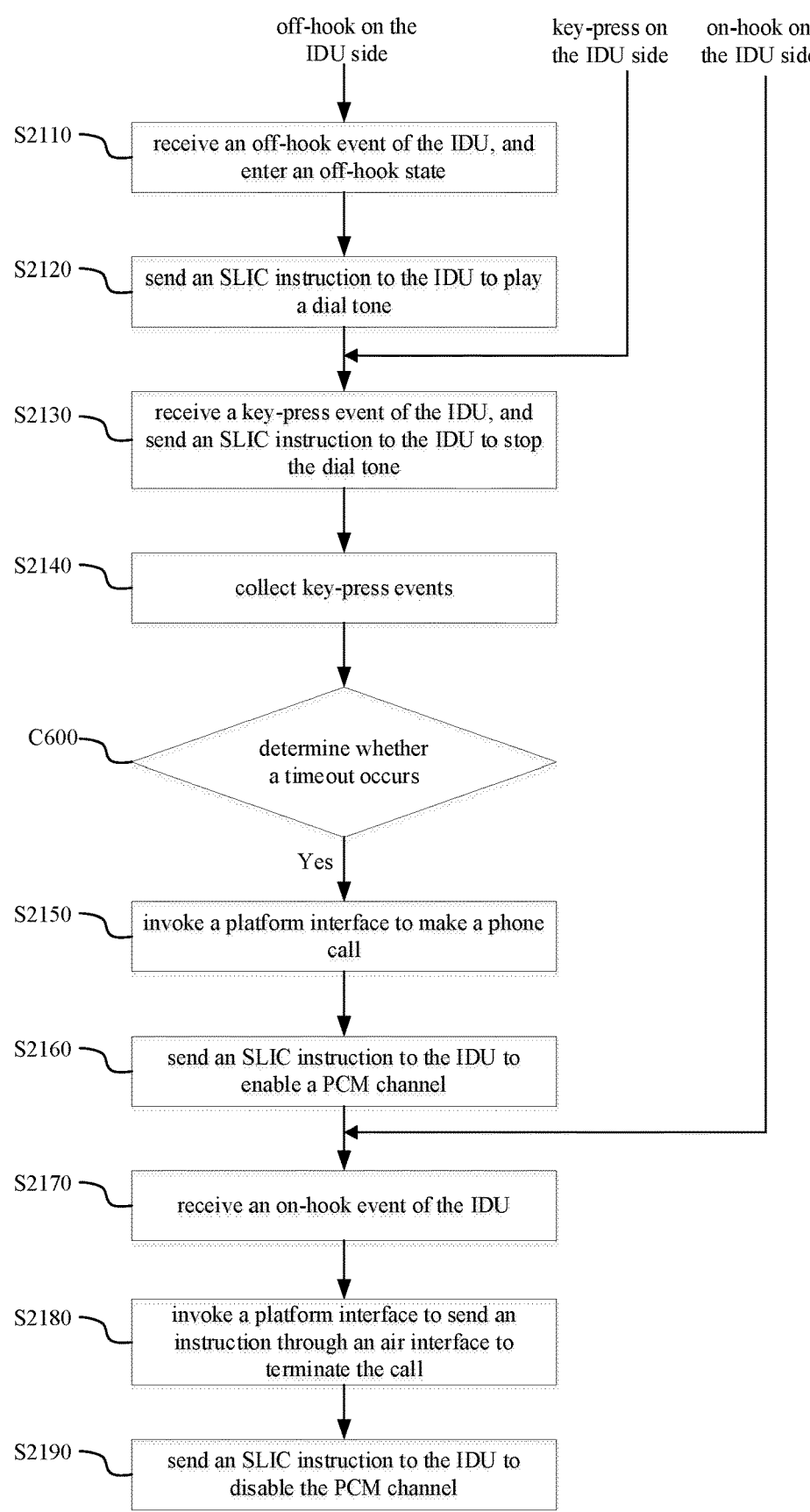
FIG. 27 is a detailed flowchart of making a phone call by a user according to an embodiment of the present disclosure.

In addition, based on the above method flowcharts in FIG. 8 to FIG. 26, as shown in FIG. 27, the present disclosure provides a detailed flowchart of making a phone call by a user. A process includes, but not limited to, steps S2110, S2120, S2130, S2140, C600, S2150, S2160, S2170, S2180, and S2190.

At S2110, an off-hook event of the IDU is received, and an off-hook state is entered.

At S2120, an SLIC instruction is sent to the IDU to play a dial tone.

At S2130, a key-press event of the IDU is received, and an SLIC instruction is sent to the IDU to stop the dial tone.

At S2140, key-press events are collected.

At C600, it is determined whether a timeout occurs. The timeout is generally 5 seconds. After the timeout, dialing is started; otherwise, wait for the user to continue to press keys.

At S2150, a platform interface is invoked to make a phone call.

At S2160, an SLIC instruction is sent to the IDU to enable a PCM channel.

At S2170, an on-hook event of the IDU is received.

At S2180, a platform interface is invoked to send an instruction through an air interface to terminate the call.

At S2190, an SLIC instruction is sent to the IDU to disable the PCM channel.

It should be noted that for specific implementations of the data processing method on the ODU side according to this embodiment of the present disclosure and corresponding technical effects, reference may be made to the above embodiments of the data processing method on the IDU side.

According to the technical scheme of this embodiment of the present disclosure, based on an 5G outdoor CPE product architecture where an SLIC chip is located in the IDU and a voice protocol stack is located in the ODU, a function of the voice protocol stack is migrated to the ODU to weaken a function of the IDU. Further, the IDU is used as an adaptation layer between a user-side device and the ODU, and a data format, i.e., label information, is defined in such way so that data sending and receiving can be performed between the IDU and the ODU according to the agreed data format. Interaction data involved is universal and basic data, and no specific service logic is involved. In the embodiments of the present disclosure, service logic and a protocol stack part of a voice function are implemented on the ODU side. Therefore, according to the technical schemes of the embodiments of the present disclosure, the data structure and the interaction process between the ODU and the IDU are simple and clear, and the interaction interfaces between the IDU and the ODU are reduced, to facilitate interface standardization between the IDU and the ODU, such that IDUs and ODUs can be cross-paired for use. In addition, the realization of the voice service logic on the ODU side is ensured to the greatest extent, thereby facilitating the popularization of the voice function and improving the stability of the voice function.

Based on the above data processing methods between the IDU and the ODU, various embodiments of the ODU, the IDU, and the computer-readable storage medium of the present disclosure are provided below respectively.

In addition, an embodiment of the present disclosure provides an IDU, including: a memory, a processor, and a computer program stored in the memory and executable by the processor.

The processor and the memory may be connected by a bus or in other ways.

It should be noted that the IDU in this embodiment may be applied to the system architecture platform in the embodiment shown in FIG. 1 and can constitute a part of the system architecture platform in the embodiment shown in FIG. 1, which belong to the same inventive concept and have the same implementation principle and technical effects, so that the details will not be repeated here.

A non-transitory software program and instructions required to implement the data processing methods between the IDU and the ODU in the foregoing embodiments are stored in the memory which, when executed by the processor, cause the processor to implement the data processing methods between the IDU and the ODU in the foregoing embodiments, for example, the method including steps which are shown in FIG. 8 to FIG. 16 and described above.

In addition, an embodiment of the present disclosure provides an ODU, including: a memory, a processor, and a computer program stored in the memory and executable by the processor.

The processor and the memory may be connected by a bus or in other ways.

It should be noted that the ODU in this embodiment may be applied to the system architecture platform in the embodiment shown in FIG. 1 and can constitute a part of the system architecture platform in the embodiment shown in FIG. 1, which belong to the same inventive concept and have the same implementation principle and technical effects, so that the details will not be repeated here.

A non-transitory software program and instructions required to implement the data processing methods between the IDU and the ODU in the foregoing embodiments are stored in the memory which, when executed by the processor, cause the processor to implement the data processing methods between the IDU and the ODU in the foregoing embodiments, for example, the method including steps which are shown in FIG. 17 to FIG. 27 and described above.

In addition, an embodiment of the present disclosure provides a computer-readable storage medium, storing a computer-executable instruction which, when executed by a processor, for example by a processor in the IDU embodiment above, causes the processor to implement the data processing method in the above embodiment, for example, implement the method including steps which are shown in FIG. 8 to FIG. 16 described above. Alternatively, the computer-executable instruction which, when executed by the processor, for example by a processor in the ODU embodiment above, causes the processor to implement the data processing method in the above embodiment, for example, the method including steps which are shown in FIG. 17 to FIG. 27 and described above.

In this embodiment of the present disclosure, based on an 5G outdoor CPE product architecture where an SLIC chip is located in the IDU and a voice protocol stack is located in the ODU, a function of the voice protocol stack is migrated to the ODU to weaken a function of the IDU. Further, the IDU is used as an adaptation layer between a user-side device and the ODU, and a data format, i.e., label information, is defined in such way so that data sending and receiving can be performed between the IDU and the ODU according to the agreed data format. Interaction data involved is universal and basic data, and no specific service logic is involved. In the embodiments of the present disclosure, service logic and a protocol stack part of a voice function are implemented on the ODU side. Therefore, according to the technical schemes of the embodiments of the present disclosure, the data structure and the interaction process between the ODU and the IDU are simple and clear, and the interaction interfaces between the IDU and the ODU are reduced, to facilitate interface standardization between the IDU and the ODU, such that IDUs and ODUs can be cross-paired for use. In addition, the realization of the voice service logic on the ODU side is ensured to the greatest extent, thereby facilitating the popularization of the voice function and improving the stability of the voice function.

Those having ordinary skills in the art can understand that all or some of the steps in the methods disclosed above and the system can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As well known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, Random Access Memory (RAM), Read-Only Memory (ROM), Electrically Erasable Programmable Read-Only Memory (EEPROM), flash memory or other memory technology, Compact Disc Read-Only Memory (CD-ROM), Digital Versatile Disc (DVD) or other optical storage, cassette, magnetic tape, magnetic disk storage or other magnetic storage device, or any other medium which can be used to store the desired information and can be accessed by a computer. In addition, as well known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited thereto. Those having ordinary skills in the art can make various equivalent modifications or replacements without departing from the scope of the present disclosure. Such equivalent modifications or replacements fall within the scope defined by the claims of the present disclosure.

What is claimed is:

1. A data processing method, performed by an Indoor Unit (IDU) of a 5G outdoor Customer Premise Equipment (CPE), wherein the IDU comprises a Subscriber Line Interface Circuit (SLIC) chip and connects with an Outdoor Unit (ODU) of the 5G outdoor CPE comprising a voice protocol stack by a network cable, the method comprising:

receiving an operation status signal from a user-side device;

generating a SLIC event message corresponding to the operation status signal according to the operation status signal;

generating a first SLIC control flow according to the SLIC event message, wherein the first SLIC control flow carries first label information corresponding to the SLIC event message; and sending the first SLIC control flow to the ODU, wherein the first label information indicates the SLIC event message which is processible to the voice protocol stack;

wherein the first label information comprises a first message identity representing the reported SLIC event message, and first message content representing data content of the reported SLIC event message.

2. The method of claim 1, wherein in response to the SLIC event message being an on-hook event message, the method further comprises one of:

determining that the first SLIC control flow has been sent successfully, in response to receiving an on-hook reply message fed back from the ODU based on the on-hook event message; or re-sending the first SLIC control flow to the ODU, in response to failing to receive the on-hook reply message fed back from the ODU based on the on-hook event message.

3. The method of claim 1, further comprising:

receiving, from the ODU, a second SLIC control flow processed by a voice protocol stack, wherein the second SLIC control flow carries second label information corresponding to a target SLIC driver interface; and determining the target SLIC driver interface according to the second label information, and invoking the target SLIC driver interface.

4. The method of claim 3, wherein after receiving, from the ODU, a second SLIC control flow processed by utilizing the voice protocol stack, the method further comprises:

generating a second SLIC control flow reply message according to the second SLIC control flow, and sending the second SLIC control flow reply message to the ODU.

5. The method of claim 3, wherein in response to the second label information representing controlling the IDU to enable a Pulse Code Modulation (PCM) channel, invoking the target SLIC driver interface comprises:

invoking the target SLIC driver interface corresponding to the second label information to enable the PCM channel; and sending a local first PCM data stream to the ODU through the PCM channel so that the ODU processes the first PCM data stream using the voice protocol stack, and acquiring, from the ODU through the PCM channel, a second PCM data stream processed by the voice protocol stack.

6. The method of claim 3, wherein the second label information comprises one of:

a second message identity representing an interface address of the invoked SLIC driver interface; or a second message identity representing an interface address of the invoked SLIC driver interface, and second message content representing data content to be transmitted by the invoked SLIC driver interface.

7. An Indoor Unit (IDU), comprising:

a memory, a processor, and a computer program stored in the memory and executable by the processor, wherein the computer program, when executed by the processor, causes the processor to perform the data processing method of claim 3.

8. An Indoor Unit (IDU), comprising:

a memory, at least one processor, and a computer program stored in the memory and executable by the processor, wherein the computer program, when executed by the processor, causes the processor to perform the data processing method of claim 1.

9. A non-transitory computer-readable storage medium storing a computer-executable instruction which, when executed by a processor, causes the processor to perform the data processing method of claim 1.

10. A data processing method, performed by an Outdoor Unit (ODU) of a 5G outdoor Customer Premise Equipment (CPE), wherein the ODU comprises a voice protocol stack and connects with an Indoor Unit (IDU) of the 5G outdoor CPE comprising a Subscriber Line Interface Circuit (SLIC) chip by a network cable, the method comprising:

receiving a first Subscriber Line Interface Circuit (SLIC) control flow from the IDU, wherein the first SLIC control flow carries first label information corresponding to an SLIC event message; and obtaining the SLIC event message according to the first label information and processing the SLIC event message by utilizing the voice protocol stack;

wherein the first label information comprises a first message identity representing the reported SLIC event message, and first message content representing data content of the reported SLIC event message.

11. The method of claim 10, wherein in response to the SLIC event message being an on-hook event message, the method further comprises:

generating an on-hook reply message according to the on-hook event message, and sending the on-hook reply message to the IDU.

12. The method of claim 10, further comprising:

acquiring a second Subscriber Line Interface Circuit (SLIC) control flow processed by utilizing the voice protocol stack, wherein the second SLIC control flow carries second label information corresponding to a target SLIC driver interface; and sending the second SLIC control flow to the IDU such that the IDU determines the target SLIC driver interface according to the second label information, and invokes the target SLIC driver interface.

13. The method of claim 12, wherein after sending the second SLIC control flow to the IDU, the method further comprises one of:

determining that the second SLIC control flow has been sent successfully, in response to receiving a second SLIC control flow reply message fed back from the IDU based on the second SLIC control flow; or re-sending the second SLIC control flow to the IDU, in response to failing to receive a second SLIC control flow reply message fed back from the IDU based on the second SLIC control flow.

14. The method of claim 12, wherein in response to the second label information representing controlling the IDU to enable a Pulse Code Modulation (PCM) channel, sending the second SLIC control flow to the IDU such that the IDU determines and invokes a target SLIC driver interface according to the second label information comprises:

sending the second SLIC control flow to the IDU such that the IDU determines a target SLIC driver interface according to the second label information, and invokes the target SLIC driver interface to enable the PCM channel; and acquiring a first PCM data stream from the IDU through the PCM channel, processing the first PCM data stream by utilizing the voice protocol stack, and sending a local second PCM data stream processed by the voice protocol stack to the IDU through the PCM channel, such that the IDU performs audio processing on the second PCM data stream.

15. The method of claim 12, wherein the second label information comprises one of:

a second message identity representing an interface address of the invoked SLIC driver interface; or a second message identity representing an interface address of the invoked SLIC driver interface, and second message content representing data content to be transmitted by the invoked SLIC driver interface.

16. An Outdoor Unit (ODU), comprising:

a memory, a processor, and a computer program stored in the memory and executable by the processor, wherein the computer program, when executed by the processor, causes the processor to perform the data processing method of claim 12.

17. An Outdoor Unit (ODU), comprising:

a memory, a processor, and a computer program stored in the memory and executable by the processor, wherein the computer program, when executed by the processor, causes the processor to perform the data processing method of claim 10.

18. A non-transitory computer-readable storage medium storing a computer-executable instruction which, when executed by a processor, causes the processor to perform the data processing method of claim 10.

* * * * *